June 10, 1969     KATSUHIKO NOMURA ET AL     3,448,668

MOTOR DRIVEN CAMERA WITH SWITCH ACTUATING ROLLER

Filed April 12, 1966

United States Patent Office 3,448,668
Patented June 10, 1969

3,448,668
MOTOR DRIVEN CAMERA WITH SWITCH
ACTUATING ROLLER
Katsuhiko Nomura and Sachio Umemura, Tokyo-to,
Japan, assignors to Asahi Kogaku Kogyo Kabushiki Kaisha, Tokyo-to, Japan, a corporation of
Japan
Filed Apr. 12, 1966, Ser. No. 541,987
Int. Cl. G03b 19/04
U.S. Cl. 95—31                                7 Claims

ABSTRACT OF THE DISCLOSURE

A camera motor driven film advance includes a film tensioning roller mounted in a spring biased pivoted bracket and extending across and urged against the film as it approaches the take-up reel. The pivoted bracket actuates a switch in series with the take-up motor to close the switch under the influence of the film against the guide roller and to release the bracket to open the switch upon the relief of the film tension at the tail of the film. Switching means are provided for actuating the motor for a film increment advance.

---

The present invention relates generally to improvements in photographic cameras and it relates more particularly to an improved photographic camera of the type provided with an electric motor driven film advancing and shutter cocking mechanism.

Under many conditions it is desirable to employ a photographic still camera which is provided with an electric motor for advancing the film a frame and cocking the shutter following the release of the shutter and exposure of the film. Such cameras are highly suitable for remote control or underwater photography or for rapid sequence photography since the operator merely actuates a shutter release element and the film is exposed and then advanced a frame and the shutter cocked. However, in the above type of electric motor actuated still camera it is highly desirable to terminate the film exposure and advancing operation upon depletion of the film. It has been conventional to this end to provide a switch in series with the electric motor power supply which is actuated by the known type of film frame counter, such as a disc or the like, to open the switch following the counting of a predetermined number of frames. With the conventional film advance terminating mechanism the last exposed frame remains in the camera focal plane and while with the conventional 35 millimeter cartridge this presents no great problem, it possesses numerous drawback and disadvantages when employed with high capacity or long film magazines. When employing a long film magazine it becomes necessary to wind the last film frame into the take-up magazine. Moreover, when using a long film it is very difficult to conveniently, accurately and easily determine its length and hence the number of frames available for exposure. Accordingly, if in the conventional mechanism the switch actuating frame counter is preset at a number greater than that of the frames available in the film, many shutter and film advance sequences will be effected without the consequent proper film exposures. On the other hand, if the frame counter is preset at a number less than that of the available frames there is a waste of film with its consequent drawbacks.

It is therefore a principal object of the present invention to provide an improved photographic still camera.

Another object of the present invention is to provide a photographic still camera of the type provided with a film advancing and shutter cocking electric motor driven mechanism.

Still another object of the present invention is to provide in a photographic still camera an electric motor driven film frame advancing mechanism which is deactivated upon the depletion of the film.

A further object of the present invention is to provide a mechanism for deactivating an electric motor driven film advance which is highly suitable for high capacity film magazines and cartridges.

Still a further object of the present invention is to provide a mechanism of the above nature characterized by its simplicity, ruggedness, reliability and low cost.

The above and other objects of the present invention will become apparent from a reading of the following description taken in conjunction with the accompanying drawings, wherein.

Figure 1:
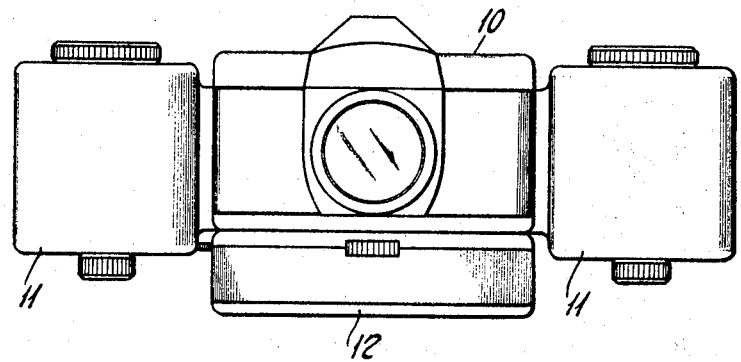
FIGURE 1 is a front elevational view of a camera provided with a high capacity film magazine and film advancing mechanism embodying the present invention.

In a sense the present invention contemplates the provision in a photographic camera of means including an electric motor for advancing film along a predetermined path through said camera, means including a deactuating switch for connecting said motor to a source of current, and movable between a motor circuit actuating and a motor circuit deactuating position, and means including a sensing element engaging said film along said predetermined path and normally urged by said film to actuate said switch to said motor circuit actuating position while said film is in said predetermined path and releasing said switch to said motor circuit deactuating position when said film is not along said predetermined path. According to a preferred form of the improved control mechanism there is provided a pair of longitudinally spaced transversely extending guides over which the film passes along its path to the film take-up spool and the sensing element is a swingably supported roller resiliently urged into engagement with a face of the film between and on the opposite side of the guide members. The switch is connected between the motor and the current source and is normally open and is retained in a closed position under the influence of the tensioned film on the sensing member.

Referring now to the drawings which illustrate a preferred embodiment of the present invention, the reference numeral 10 generally designates a 35 millimeter camera having releasably coupled thereto in a known manner a large capacity film magazine 11 and an electric motor driven film advance and shutter cocking and release mechanism 12. Also associated with the present camera arrangement is one or a pair of sprocket wheels 13 which engage the film sprocket openings.

A split take-up spindle 14 is positioned in an end chamber 15 in the magazine 11 and provided with a side opening and is driven by an electric motor 16, forming part of the mechanism 12. A film storing cassette 17 is separably housed in the chamber 15 and includes a take-up spool 18 which releasably engages the take-up spindle 14 to permit the rotation of the spool 18. The magazine 11 includes a removable rear wall 19 providing access to the opposite end chambers 15 and cassettes 17.

Mounted on the inner face of the magazine rear wall 19 adjacent to the side of the sprocket wheels 13 which face the take-up chamber 15 is a forwardly directed first bracket 20 which supports a transversely extending guide roller 21 adjacent the outer rear quadrant of the sprocket wheels 13. A second forwardly projecting bracket 22 is mounted on the magazine rear wall 19 at the entrance to the chamber 15 and supports a second transverse guide roller 23.

A normally open switch S1 is mounted in a recess 24 located adjacent the front wall of the magazine 11 and the entrance to the chamber 15 and includes a relatively stationary rearwardly projecting contact arm S1a and a rearwardly projecting cooperating resilient movable contact arm S1b normally self urged out of engagement with the contact arm S1a.

A transversely extending bracket 26 is supported by a pin 27 for rocking about a transverse axis shortly inwardly rearwardly of the switch S1 and includes a vertical cross-bar 28 and rearwardly directed end legs 29. A sensing member defining transverse roller 30 extends between and is supported by the bracket legs 29. A switch actuating arm 32 projects rearwardly from the cross bar 28 and registers with the switch arm S1b so that rocking of the bracket 26 counter-clockwise as viewed in FIGURES 2 and 3 effects the closing of switch S1 and rocking of the bracket 26 clockwise releases the switch S1 to its open position. A spring is provided for normally urging the bracket clockwise and stop means are provided for limiting the counter-clockwise rotation of the bracket 26. It should be noted that when the bracket 26 is in its counter-clockwise position with the arm 32 closing switch S1 the sensing roller 30 is somewhat rearwardly of the tangent plane of the front faces of guide rollers 21 and 23 as shown by broken line in FIGURE 3 and when the bracket 26 is in its switch open clockwise position, as shown by full line, the sensing roller 30 extends further rearwardly.

Figure 2:
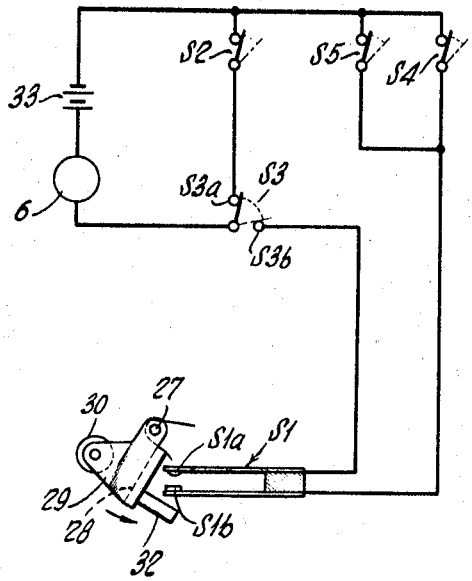
FIGURE 2 is a circuit diagram of the film advancing motor control network.
Figure 3:
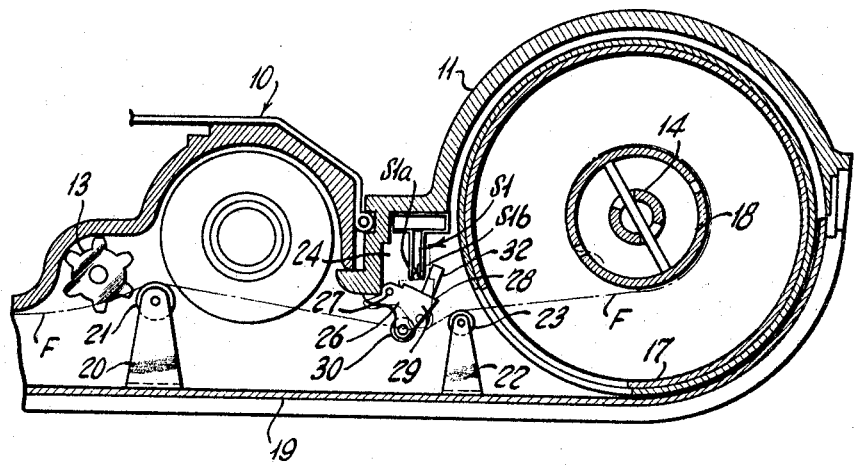
FIGURE 3 is an enlarged fragmentary horizontal transverse sectional view of the film advance control mechanism illustrated in a loaded condition.
Figure 4:
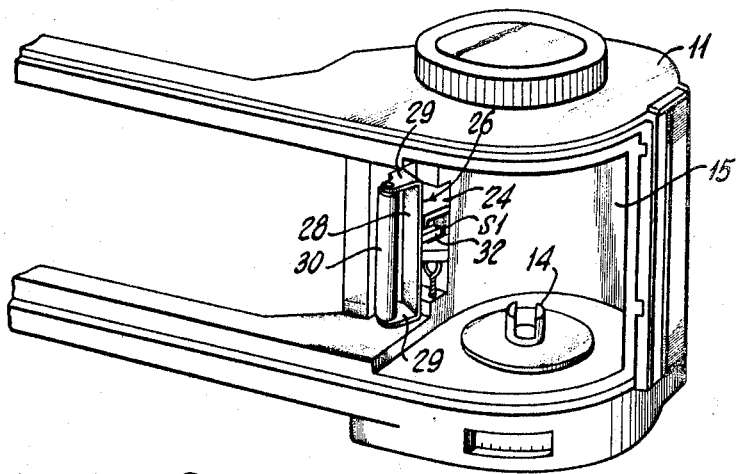
FIGURE 4 is a fragmentary rear perspective view thereof in an unloaded condition.

The circuit diagram of the control network of the present system is shown in FIGURE 2 and includes a battery 33 having a first terminal connected to a first terminal of the drive motor 16 and a second terminal connected through a switch S2 to a contact S3a of a double throw switch S3 the arm or blade of which is connected to the second terminal of the motor 16. The other contact S3b of the switch S3 is connected through the switch S1 and a series connected normally open switch S4 to the first terminal of the battery 33. The switch S4 is shunted by a normally open remote switch S5.

The switch S1 is associated with the film sensing mechanism as described above. The switches S4 and S5 are coupled to shutter release elements either proximately or remotely positioned in the known manner to close the respective switch upon depression or other manipulation of the actuating element, the motor 16, upon energization thereof, effecting the actuation or release of the shutter. The switch S2 is synchronously associated with the camera shutter so as to be open while the camera shutter is open and closed while the camera shutter is closed; and the switch arm of switch S3 is coupled to the camera operation so as to engage the contact S3b as shown by broken line in FIGURE 2, from the time of completion of a film frame advance until the completion of the shutter release operation, following which it engages the contact S3a.

Considering now the operation of the mechanism described above, upon the loading of the camera and magazine with a film F, the film F transverses a path in engagement with the sprocket wheels 13 along the front peripheries of the guide rollers 21 and 23 and along the rear periphery of the sensing roller 30 and thence around the take-up spool 18. Before depletion of the film F it is maintained in the customary manner under tension so that it transverses a predetermined path as shown in FIGURE 2 by broken line, the film traversing such path urging the sensing roller 30 forwardly to swing the bracket 26 and arm 32 counterclockwise to thereby maintain the switch S1 in a closed condition. Upon actuating of the shutter release element, switch S4 or S5 is closed and the switch S3 arm being in engagement with the contact S3b the motor 16 is energized through the closed switch S1 to effect the release of the camera shutter and the shifting of the switch S3 arm into engagement with contact S3a. With the opening of the camera shutter, switch S2 is open to deenergize the motor 16 during exposure. Upon the closing of the camera shutter the switch S2 is closed to energize the motor 16 which cocks the shutter and advances the film an increment or frame following which the switch S3 arm is returned to engagement with the contact S3b and the motor 16 is deenergized.

The above cycle may be repeated as long as there is film F available. However, upon depletion of the film F, the tension on the film F between the guide rollers 21 and 23 is relieved and the film F is shifted rearwardly from its predetermined path by the sensor roller 30 under the influence of the spring urged bracket 26 to permit the bracket 26 and arm 32 to swing clockwise and effect the opening of the switch S1. Since the switch S1 is open and the switch S3 arm engages the contact S3b the shutter cannot be released or the film advanced by the closing of switches S4 and S5 thereby indicating the depletion of the film.

While there has been described and illustrated a preferred embodiment of the present invention, it is apparent that numerous alterations, omissions and additions may be made without departing from the spirit thereof.

What is claimed is:

1. In a photographic camera, means including an electric motor for advancing film along a predetermined path through said camera, means including a deactuating switch for connecting said motor to a source of current, and movable between a motor circuit enabling and a motor circuit disabling position, and means including a sensing element comprising a guide element extending transversely across and spring urged against said film along said predetermined path to resiliently urge said film transversely from said predetermined path and normally urged by said film under a predetermined tension to actuate said switch to said motor circuit enabling position while said film is in said predetermined path and releasing said switch to said motor circuit disabling position when said film is displaced from said predetermined path.

2. The photographic camera of claim 1 wherein said switch is connected in series between said electric motor and said source of current and the motor circuit enabling and disabling positions of said switch are defined by the closed and open positions thereof respectively.

3. The photographic camera of claim 1 including a pair of longitudinally spaced guide members extending transversely across and engaging a face of said film along said predetermined path, means for releasably tensioning said film between said guide members, and means resiliently urging said guide element against the opposite face of said film between said guide members.

4. The photographic camera of claim 3 wherein said guide element comprises a transversely extending roller and including a bracket mounted for rocking about a tranverse axis and supporting said roller in a position offset relative to said axis.

5. The photographic camera of claim 1 including a normally open shutter release switch connected in series with said deactuating switch and said electric motor.

6. The photographic camera of claim 5 including a double throw switch including an arm connected to a first terminal of said electric motor the second terminal of which is connected to a first terminal of said source of current the second terminal of which is connected to a first contact of said double throw switch, the second contact of said double throw switch being connected through said actuating and release switches in series to said current source second terminal, said double throw switch arm being coupled to said camera to engage said second contact between the completion of a film advancing cycle and the completion of a shutter release operation.

7. The photographic camera of claim 5 including a double throw switch including an arm connected to a first terminal of said electric motor the second terminal of which is connected to a first terminal of said source of current, a fourth switch, the second terminal of said source of current being connected to a first contact of said double throw switch the second contact of which is connected through said actuating and release switches in series to said current source second terminal, said double throw switch arm being coupled to said camera to engage said second contact between the completion of a film advancing cycle and the completion of a shutter release operation and said fourth switch being coupled to said camera to be open during the open position of the camera shutter.

References Cited

UNITED STATES PATENTS

| | | | |
|---|---|---|---|
| 3,064,522 | 11/1962 | Fukuoka | 95—31 |
| 3,098,418 | 7/1963 | Reiher et al. | 95—31 |
| 3,138,080 | 6/1964 | Jacobson | 95—31 |
| 3,142,238 | 7/1964 | Hofmann et al. | 95—31 |
| 3,169,460 | 2/1965 | Winkler et al. | 95—31 |

FOREIGN PATENTS 1,156,639 10/1963 Germany.

NORTON ANSHER, *Primary Examiner*.

J. F. PETERS, JR., *Assistant Examiner*.

U.S. Cl. X.R.

352—174